United States Patent Office 3,453,086
Patented July 1, 1969

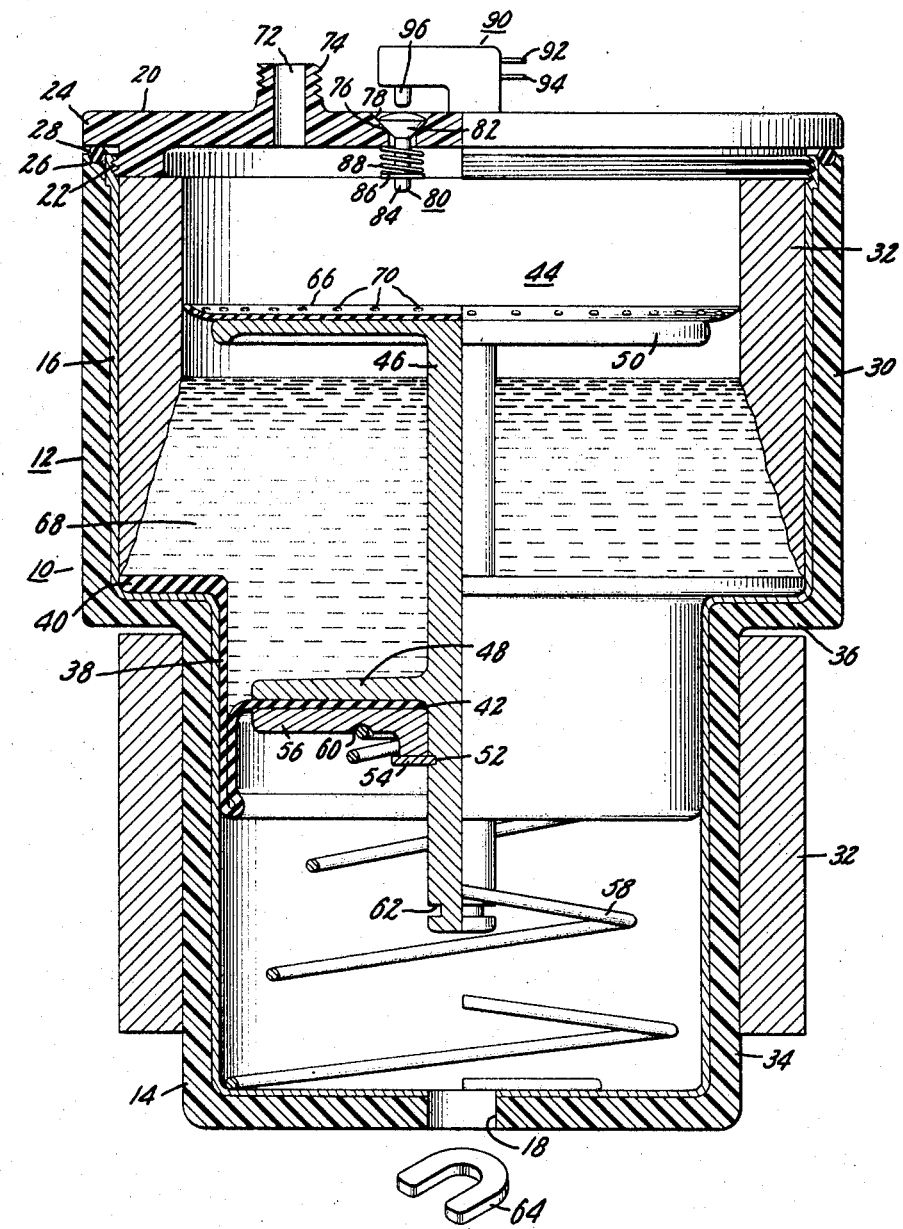

3,453,086
SELF-REGULATING GAS GENERATOR
Robert L. Harm, Boxford, Mass., assignor to General
Electric Company, a corporation of New York
Filed Oct. 12, 1965, Ser. No. 495,046
Int. Cl. B01j 7/02
U.S. Cl. 23—282                                  8 Claims

ABSTRACT OF THE DISCLOSURE

A hydrogen gas generator contains a liquid reactant in a resiliently deformable container below an annular solid reactant. A piston assembly is coupled to the container; and is spring biased upwardly to deform the container to raise the liquid into contact with the solid, and is gas biased downwardly to withdraw the liquid from contact with the solid.

My invention relates to a pressure responsive gas generator.

Many forms of apparatus are known for bringing together materials for chemical reaction to usefully generate gas. Many of the simplest and most widely used gas generators are constructed from elements of laboratory glassware and accordingly suffer the disadvantages of inability to withstand large pressure differentials and general fragility. Other gas generators, while ruggedly constructed, are cumbersome in construction rendering them unsuitable for mounting in compact units. Further, many conventional generator arrangements are not constructed so as to allow for efficient and economical manufacture. Finally, many gas generators though otherwise acceptable require external controls to regulate the rate at which gas is formed. Such generators typically require means to monitor the gas pressure generated as well as means to continuously supply one or more reactants to the generator and means to control the rate at which reactants are brought together.

It is an object of my invention to provide a gas generator which is self-regulating.

It is another object to provide a gas generator of compact and rugged construction.

It is a further object to provide a gas generator susceptible to low cost manufacture.

It is a still further object to provide a gas generator which can be quickly placed in operation.

These and other objects of my invention are accomplished by providing a gas generator comprising housing means containing a solid reactant. A diaphragm is sealed to the housing means below the solid reactant and supports a liquid reactant. Means are provided to bias the diaphragm upwardly as well as means for controlling upward movement of the diaphragm and the liquid reactant. Means are also provided for the exhaust of gas from the housing means upon contact of the liquid reactant with the solid reactant.

My invention may be better understood by reference to the following detailed description considered in conjunction with the drawing, which is a vertical section of a gas generator constructed according to my invention.

The gas generator 10 shown in the drawing is comprised of a housing 12 having an outer, non-conductive casing 14 and an inner, conductive casing 16. An opening 18 is provided at the lower end of the housing. The housing includes a closure 20 which is shown threadedly attached to the inner casing at 22. An exterior annular flange 24 formed integrally with the closure overlies a groove 26 in the outer casing. An O-ring seal 28 positioned in the groove seals between the closure and outer casing.

The housing is formed of an upper, enlarged diameter portion 30 having an inside diameter conforming to the outside diameter of an annular solid reactant body 32. The housing is also formed of a lower, reduced diameter portion 34 having an outside diameter corresponding to the inside diameter of an identical solid reactant body 32.

The upper and lower housing portions are connected by an integral stepped portion 36. A diaphragm 38 is mounted within the housing. The diaphragm is provided with an upper, exterior flange 40 supported on the stepped portion. The exterior flange in turn supports the solid reactant body contained within the housing.

The diaphragm is provided with a central aperture 42. A control unit 44 extends through the aperture and is sealingly engaged with the diaphragm. The control unit is comprised of a control stem 46 having integrally formed therewith an upper flange 48 and a splash guard support 50. A groove 52 is provided in the control stem spaced below the upper flange. A snap ring 54 is mounted in the groove to hold a clamping ring 56 in position. The clamping ring cooperates with the upper flange to sealingly engage the central portion of the diaphragm lying therebetween.

Interposed between the lower end of the housing and the clamping ring is a resilient compression spring 58. A groove 60 is provided in the underside of the clamping ring to receive the upper end of the spring. In order to hold the spring in compressed position, a locking groove 62 is provided in the lower end of the control stem. A lock 64 is provided to slide into the locking groove when the lower end of the control stem protrudes beneath the lower end of the housing to prevent the spring from retracting the control stem back inside the housing.

A splash guard 66 is positioned on the upper surface of the splash guard support. The exterior diameter of the splash guard approximately corresponds to the inside diameter of the solid reactant body.

The diaphragm supports a body of liquid reactant 68 in the housing below the splash guard. Ports 70 are provided in the splash guard to conduct gas formed by the reaction of liquid and solid reactant therebeneath. A gas exhaust port 72 is provided in the housing above the splash guard. A threaded coupling 74 is provided for connection of an external gas conduit to the housing.

As an auxiliary control feature, the housing is provided with a pressure relief port 76 having its upper portion formed as a frusto-conical valve seat 78. A poppet valve 80 is mounted in the relief port. The valve is comprised of a valve head 82 cooperating with the valve seat and a valve stem 84. A shoulder 86 is formed on or attached to the valve stem. A valve spring 88 is compressed between the shoulder and the housing.

Mounted on the housing above the valve head is an electrical switch 90. The switch includes electrical terminals 92 and 94. A switch control button 96 is adapted to open or close an electrical contact between the terminals in response to movement of the valve head.

In practice, the gas generator 10 is completely assembled except for liquid reactant 68, solid reactant body 32, and closure 20. Liquid reactant 68 is then placed in the generator and the control unit 44 moved downwardly so that control stem 46 extends through apertures 18 in the housing. Lock 64 is then placed in position in locking groove 62. This seals the lower surface of the splash guard support to the exterior flange 40 of the diaphragm support. Thus, the liquid reactant is contained in a completely sealed chamber. Next, the solid reactant body 32 is placed in the upper portion of the housing, and the closure is attached. An extra solid reactant body for use in the gas generator may be mounted on the lower portion 34 of the housing for storage. If the reactant is of such a type as to react while mounted in this position, the exposed external surfaces of the solid reactant body may be provided with a protective coating or shell.

Gas generation is initiated merely by removing the lock 64 from the control stem 46. The control unit and diaphragm moves upwardly in the housing in response to the biasing force of spring 58 until the gas within the housing is sufficiently compressed to offset the spring force. As this occurs, the liquid reactant moves upwardly into contact with the inside surface of the solid reactant body. The solid and liquid reactants begin producing gas on contact.

The gas evolved is transported from the housing through exhaust port 72. If the rate of gas evolution exceeds the rate of gas removal from the housing, pressure will be built up. This pressure will prevent any further upward movement of the control unit and diaphragm within the housing. This in turn prevents the liquid from moving upwardly in the housing and increasing its contact area with the solid reactant. In some circumstances, the pressure generated will be sufficient to push the liquid downwardly completely out of contact with the solid reactant thereby completely stopping gas evolution. As gas is taken from the generator, the pressure will be reduced to allow the liquid and diaphragm to be moved upwardly again to resume contact with the solid reactant body and thereby generate more gas. Accordingly, it is apparent that the gas generator is self-regulating. That is, it is responsive to pressure buildup within the housing to slow or even stop gas evolution.

To prevent the reaction occurring at the reactant interface from becoming independent of the surface level of the liquid reactant, a splash guard 66 is provided just above the interface. With certain types of reactants there may be a tendency for reaction to occur so violently that liquid is thrown upwardly into contact with the inner surface of the solid reactant body above the surface of the liquid body. This, of course, could lead to a run-away reaction within the generator. To prevent this, the splash guard is provided to intercept any liquid thrown upwardly by the force of the reaction. The ports 70 in the splash guard allow the free passage of gas generated.

If excessive pressure should build up in the housing (although this should not normally occur), the pressure exerted on poppet valve 80 will cause the valve spring 88 to be compressed providing clearance for gas escape between valve seat 78 and valve head 82. This venting of the housing will not actuate the control button 96 of switch 90 if only slight venting is required, since there is clearance provided between the valve head 82 and the control button; however, a high rate of venting will actuate the control button so that a warning signal can be generated by an electrical circuit attached to terminals 92 and 94. As gas is taken from the generator, the lower portion of the solid reactant body will be depleted. The control unit will then move upwardly to again bring the liquid into contact with the remaining solid reactant. When the solid reactant body has been substantially fully reacted, the control unit will contact the valve stem 84 and force the valve head into contact with the switch control button. It is then apparent that the switch may be actuated either in response to a large excess pressure buildup within the housing or responsive to depletion of the solid reactant body.

The particular reactants used in the generation of gas form no part of my invention. Any known combination of liquid and solid reactants which will produce gas may be employed. The housing, diaphragm, and control unit are, of course, formed of materials chosen for their resistance to chemical attack by the reactants. My gas generator is particularly advantageous for chemical reactions in which gas evolution is accelerated by a closed electrical circuit between an anode and a cathode. In such reaction, the solid reactant body serves as an anode, and the control unit serves as a cathode. The electrical circuit between the two is comprised of the spring 58 and the inner casing 16 as one conductive path and the liquid reactant as the second, ionically conductive path. As a specific example, if a metal such as magnesium, zinc, or aluminum is used as a solid reactant and the liquid reactant is a salt solution such as an alkali halide or dilute acid, hydrogen will be slowly evolved at the solid-liquid reactive interface if the inner casing 16 is formed of a non-conductive material, such as rubber or resin. On the other hand, using a conductive inner casing the rate of hydrogen generation is greatly accelerated, since the electrons given up by the solid reactant can be transported through the casing, spring, and control unit for liberation to the liquid reactant.

While my invention has been described with reference to a preferred embodiment, it appreciated that numerous modifications may be made in the described structure without departing from the purview of my invention. For example, the housing need not be formed of two casings as shown but may be formed of a single casing of either a conductive or a non-conductive material. It is unnecessary to form the housing into a large diameter portion and a small diameter portion. The entire housing may be formed of a single diameter. The particular type of closure forming part of the housing may be modified as well as the particular means for attaching the closure to the remainder of the housing.

The solid reactant body need not be annular as shown. The solid reactant body may be polyhedral. Alternately, the single reactant body may be replaced by a plurality of bodies attached to the inside surface of the housing. Where there is no tendency for a reaction to occur with excessive force, the splash guard and splash guard support may be omitted. In such instance, the control stem would terminate at the upper flange. The particular means of attaching the control unit to the diaphragm may be varied according to conventional practice. It is not necessary to use a spring to bias the diaphragm and control unit upwardly. This function may be formed by any resilient means, such as for example an annular body of sponge rubber or a body of compressed gas supplied through opening 18. Alternately, the diaphragm may be formed of sufficiently resilient material that no separate biasing means is required. The lock, pressure relief valve, and switch are not essential elements and may be replaced by equivalent conventional elements or omitted entirely.

Since these and other modifications of my preferred embodiment will be obvious to those skilled in the art, it is requested that the scope of my invention be determined by reference to the following claims.

What I claim as new and desire to secure by Letters Patent of the United States is:

1. A gas generator for reacting a solid reactant with a liquid reactant to generate a gas comprising:
   a housing having an interior with an upper portion and a lower portion;
   said upper interior portion being adapted to receive a quantity of the solid reactant;
   container means disposed within said lower interior portion and adapted to receive and store a quantity of the liquid reactant;
   said container means including control means for progressively changing the configuration and thereby the storage capacity of said container means from a maximum, whereat all of the liquid reactant will be disposed in said lower interior portion of said housing, through an intermediate range, whereat some of the liquid reactant will be disposed in said upper interior portion and in gas generating contact with some of the solid reactant, to a minimum, whereat all of the liquid reactant will be disposed in said upper interior portion and in gas generating contact with a maximum of the solid reactant.

2. A gas generator according to claim 1 wherein:
   said control means includes
   spring means biasing said container means towards a minimum storage capacity configuration, and gas pressure responsive means for opposing said spring means bias.

3. A gas generator according to claim 2 wherein:

said container means includes a resiliently deformable, cup-shaped diaphragm, whose upper, annular margin is sealed to said housing interior between said upper and lower portions; and said control means further includes a piston-like means disposed longitudinally through said cup-shaped diaphragm and sealed to and rigidly supporting at least the control portion of the bottom of said diaphragm on both the upper and lower surface thereof.

4. A gas generator according to claim 3 wherein:

said spring means is a compression spring disposed within said interior lower portion of said housing and captured between said piston-like means and the bottom of said interior of said housing.

5. A gas generator according to claim 4 wherein:

said piston-like means includes a downwardly extending portion, and said housing includes a locking means adapted to interlock with said downwardly extending portion whereby to lock said piston-like means downwardly against the bias of said spring means with said container means in its maximum storage capacity configuration.

6. A gas generator according to claim 3 wherein:

said housing is adapted to receive a quantity of solid reactant which is annular in configuration having a longitudinal bore, whereby when said container means is in a less than maximum storage capacity configuration, at least some of the liquid reactant is displaced upwardly into the bore of the solid reactant to contact the surface of the bore; and said piston-like means includes an upwardly extending portion extending through and above the liquid reactant and having a distal subportion extending radially therefrom to obturate the bore above the liquid when some liquid is in the bore, said distal subportion serving as a splash guard.

7. A gas generator according to claim 3 further including:

means responsive to the change of said diaphragm to its minimum storage capacity configuration for providing a signal indicative of the depletion of the solid reactant.

8. A gas generator according to claim 3 wherein:

said housing is adapted to receive a quantity of solid reactant which is annular in configuration having a fixed inner diameter and a fixed outer diameter; and the inner diameter of said housing upper portion is greater than the solid reactant outer diameter, and the outer diameter of said housing lower portion is smaller than the solid reactant inner diameter.

References Cited

UNITED STATES PATENTS

| | | | |
|---|---|---|---|
| 591,367 | 10/1897 | Beck | 48—28 |
| 663,240 | 12/1900 | Remington | 48—31 |
| 767,289 | 8/1904 | Kirkwood | 23—282 |
| 1,257,314 | 2/1918 | Castellano | 23—282 |
| 3,174,833 | 3/1965 | Blackmer | 23—282 |
| 3,268,298 | 8/1966 | La Costa et al. | 23—282 |

MORRIS O. WOLK, *Primary Examiner.*

R. E. SERWIN, *Assistant Examiner.*